Patented Oct. 19, 1948

2,451,630

UNITED STATES PATENT OFFICE 2,451,630

METHOD OF MAKING SWEET CHOCOLATE

Edward F. McGee, Wayland, Mass.

No Drawing. Application September 18, 1945,
Serial No. 617,181

6 Claims. (Cl. 99—23)

This invention relates to an improved sweet chocolate and method of manufacturing the same.

In accordance with the usual methods of making sweet chocolate dry sugar (sucrose) is first mixed with chocolate liquor and the mixture is then thoroughly ground in a multi-roll refiner, after which cocoa butter is usually added and the mixture conched to the desired smoothness. In such processes the sugar, as a solid, is mechanically dispersed through or ground into the chocolate liquor and the smoothness and texture of the resulting product is dependent upon the degree or extent of refining and conching. Such procedures are not only time consuming and require expensive machinery, but also involve handling dry sugar (requiring disposal of containers) and other operating inefficiencies.

The principal objects of the present invention are to provide a sweet chocolate of improved flavor and to provide an efficient and reliable method of making sweet chocolate using a sugar solution or sirup, as distinguished from dry sugar, thereby permitting operating economies and minimizing, if not overcoming, the aforementioned objectionable features.

Further objects and advantages will be apparent from a consideration of the following disclosure.

The present invention is based on the discoveries and observations that a given concentration of sugar sirup will, at a given temperature, precipitate sugar in crystalline form until the remaining sirup is sufficiently diluted to withstand that temperature, there being a maximum concentration for every temperature up to the point of complete dryness. Crystals of sugar formed in sirup do not spring into being fully developed as to size. They are at first very minute and then grow in size, their growth being governed by the speed with which the sirup is forced to give up sugar. If the temperature of the sirup is reduced rapidly below the critical point of a given concentration, a large number of small crystals will be formed and as the temperature to concentration ratio is changed slowly, a smaller number of large crystals will be formed.

Where the cooling of sucrose sirup with a fairly low percentage of water is sufficiently rapid, there will be no crystallization and the sirup becomes a viscous mass. If the temperature is reduced low enough, the viscous mass will freeze to a hard solid without formation of crystals or grains. If such a viscous mass is then warmed and agitated, it will upon reaching the critical temperature rapidly crystallize, forming a maximum number of very small crystals with a minimum of residual sirup. A relatively small quantity of sirup widely dispersed in a nonliquid material, when dried to the crystallization point, will form minute crystals since the crystals have little adjacent sirup on which to feed.

By producing a viscous sugar solution at a temperature below the crystallization point of the sugar and subsequently dispersing the viscous solution throughout a mass of chocolate liquor, and therefore working or slowly raising the temperature of the mixture until the crystallization point has been reached, I am able to prepare a sweetened chocolate wherein the sugar is uniformly dispersed throughout the mass in the form of fine crystals of microscopic dimensions, thereby avoiding the necessity of extensive mechanical grinding and dispersing dry sugar throughout the chocolate liquor, as in the present day practices in making sweet chocolate. The sweetened chocolate thus produced is therefore a dispersion wherein the chocolate liquor, with or without added cocoa butter, constitutes the continuous phase, and microscopic crystals of sucrose (along with minor proportions of crystals of other types of sugar where the original sugar solution was a mixture of sucrose and other sugars) constitute the dispersed phase.

In accordance with the present invention, a sucrose sirup, such as received from a sugar refinery or otherwise procured or produced, is first heated in a suitable kettle or evaporator until a maximum workable sugar concentration is reached which will produce a minimum of water content without crystallization. This concentration is at least 80%, preferably being between 85% and 90% but will vary with equipment and technique. The term "sucrose sirup" as herein used not only includes the commercially available aqueous solutions of cane sugar having a sucrose content of approximately 63%, but also solutions of mixed sugars, the sucrose content of which (based on total sugar present) is at least 90%, the remainder being glucose, corn sirup and all other types of sugar.

When the sirup is reduced to the proper water content, it is then cooled, as for example, by being transferred to a cold chamber, drum or other apparatus, care being taken that the transfer is accomplished with as little loss of temperature as is possible or in such a manner as to prevent crystallization during the transfer. In any event the sirup must be cooled in such a manner so that it will become a thick viscous mass without crystallizing. If desired, cooling may be continued far beyond this stage, even to the point of solidification, without damage.

After cooling, the viscous mass is then preferably tempered by warming to a point at which the sirup assumes a workable consistency, preferably comparable to a soft molasses candy, at which time melted chocolate liquor, at a temperature slightly above its melting point, is added and thoroughly mixed or worked with the viscous sirup. During the mixing operation the mixture may be gradually warmed, care being taken to see that thorough mixing has taken place by the time crystallization temperature has been reached. As the mixture is worked and warms up, it reaches a critical temperature at which the sugar suddenly crystallizes or breaks up, as is evidenced by the mass becoming stiff and somewhat crumbly.

The stiffened mass is then dried while being agitated, and, if desired, sufficient cocoa butter may be added during the drying operation to obtain the desired viscosity. During the drying operation care must be taken to avoid overheating, and to this end the temperature of the mass must at no time be high enough to dissolve or liquefy the dispersed sugar crystals, because if an appreciable amount of sugar dissolves or liquefies after crystallizing, the dissolved sugar particles apparently tend to agglomerate and upon cooling crystallize out to form undesirably large crystals that impart a rough coarse texture to the chocolate. The drying operation is continued until the desired moisture content has been reached.

A specific example of what is now considered a preferred procedure is as follows: A sugar solution is prepared by dissolving 3 parts of cane sugar in 1 to 2 parts water, heat being applied until solution takes place, and thereafter the solution is boiled until a concentration of about 85% to 90% sugar is reached. Alternatively, a sucrose sirup, as procured on the market, may be used, in which case the sirup is boiled until a concentration of about 85% to 90% sugar is reached. In either case the resulting product is in a highly concentrated or supersaturated sucrose solution which is then transferred to a cooling chamber either equipped with refrigerating coils or dry ice compartments effective rapidly to cool the sirup to a temperature of 85° to 90° F., or below, into supercooled or viscous mass without crystallization taking place. The mass may then be transferred to a jacketed mixer for further processing.

In the meantime a tempered chocolate liquor is prepared by heating the chocolate liquor to a temperature of about 90° F., and the chocolate liquor is then added to the sucrose solution, the particular proportions of ingredients depending upon the degree of sweetness desired. As a general rule, 5 parts of the tempered sucrose solution to 2 to 8 parts of chocolate liquor are the preferred proportions, and in any case the mixture is thoroughly mixed, preferably with a rapid agitation such as produced by a beater, while maintaining the temperature at about 90° F. until a homogeneous mass has been obtained. During the latter part of the mixing operation, apparent crystallization of the sugar component takes place as is evidenced by a perceptible stiffening of the batch which, with continued mixing, becomes somewhat dry or crumbly.

The mixed batch may then be transferred to a suitable drying equipment such as an open pan dryer or a vacuum dryer, the preferred forms of apparatus being a Melengeur, Simpson or the like, equipped with a hood, heating coil and vacuum system, and also with an agitator. A temperature of about 75° F. is preferably maintained throughout the entire drying period, but in any event the maximum temperature should be substantially below the solution or liquefaction point of fine sugar crystals, that is, less than approximately 110° F. The drying is continued until the moisture content of the mass has been reduced to not more than about 5%, but preferably about 1% to 2%, and at this stage of the process the batch has assumed a thick viscous character, the viscosity of which may vary from 200 to 1,000 degrees McMichael.

If desired, sufficient cocoa butter (for example, 1 to 2 parts) may be added to the partially dried mass during the drying operation to obtain the desired viscosity, together with flavoring and other ingredients specified in the formulation, and after drying the mixture may, if desired, be given a slight refining or otherwise processed for market in accordance with conventional procedures.

I claim:

1. Method of making sweet chocolate which comprises cooling a concentrated sucrose sirup at a rate sufficiently rapid to form a viscous supersaturated mass substantially free from sugar crystals, uniformly mixing said viscous mass with a liquefied chocolate liquor at a temperature below the crystallization point of the sugar component of the mixture, working the mixture and warming it to a temperature at which the sugar component crystallizes out in the form of fine crystals, and thereafter drying the mass at a temperature less than the solution point of said sugar crystals.

2. Method of making sweet chocolate which comprises cooling a concentrated sucrose sirup at a rate sufficiently rapid to form a viscous supersaturated mass substantially free from sugar crystals, uniformly mixing said viscous mass with a liquefied chocolate liquor at a temperature below the crystallization point of the sugar component of the mixture, working the mixture and warming it to a temperature at which the sugar component crystallizes out in the form of fine crystals, drying the mass at a temperature less than the solution point of said sugar crystals, and incorporating cocoa butter in said mass during the drying operation.

3. Method of making sweet chocolate which comprises heating a sucrose solution to produce a concentrated sirup having a sugar content of at least 80%, cooling said solution at a rate sufficiently rapid to form a viscous supersaturated mass substantially free from sugar crystals, mixing the viscous mass with a liquefied chocolate liquor at a temperature below the crystallization point of the sugar component of the mixture, working the mixture and warming it to a temperature at which the sugar component crystallizes out in the form of fine crystals, and thereafter drying the mass at a temperature less than the solution point of said sugar crystals.

4. Method of making sweet chocolate which comprises heating a sucrose solution to a concentrated sirup having a sugar content of at least 80%, cooling said solution to a temperature below 90° F. at a rate sufficiently rapid to form a viscous supersaturated mass substantially free from sugar crystals, tempering the viscous mass by raising its temperature to approximately 90° F., working the tempered viscous mass with a melted chocolate liquor at a temperature of approximately 90° F. until the sugar component crystallizes out, and thereafter drying the batch until its moisture content is reduced to less than 5%.

5. Method of making sweet chocolate which comprises cooling a concentrated sucrose solution at a rate sufficiently rapid to form a viscous supersaturated mass, mixing 5 parts of the viscous mass with 2 to 8 parts of a liquefied chocolate liquor at a temperature below the crystallization point of the sugar component of the mixture, working the mixture and warming it to a temperature at which the sugar component crystallizes out in the form of fine crystals, and thereafter drying the mass at a temperature less than the solution point of said sugar crystals.

6. Method of making sweet chocolate which comprises cooling a supersaturated solution containing a major proportion of sucrose at a rate sufficiently rapid to form a viscous supersaturated mass substantially free from crystals, mixing 5 parts of said viscous mass with 2 to 8 parts of a melted chocolate liquor at a temperature below the crystallization point of the sugar component of the mixture, working the mixture and warming it to a temperature at which the sugar component crystallizes out in the form of fine crystals, drying the mass at a temperature less than the solution point of said sugar crystals, and during the drying operation incorporating sufficient cocoa butter to obtain the desired viscosity.

EDWARD F. McGEE.

REFERENCES CITED

The following references are of record in the file of this patent:

UNITED STATES PATENTS

| Number | Name | Date |
| --- | --- | --- |
| 2,117,344 | Middleton | May 17, 1938 |
| 2,188,489 | Veatch | Jan. 30, 1940 |
| 2,336,254 | Jones | Dec. 7, 1943 |

FOREIGN PATENTS

| Number | Country | Date |
| --- | --- | --- |
| 7,800 | Great Britain | 1901 |
| 140,463 | Great Britain | 1921 |